United States Patent [19]
Frydman

[11] 3,976,344
[45] Aug. 24, 1976

[54] ASSEMBLY SYSTEM FOR FURNITURE PANELS

[76] Inventor: Georges Frydman, Le Rambouillet, Avenue Edith Cavel, 06000 Nice, France

[22] Filed: Feb. 3, 1975

[21] Appl. No.: 546,445

Related U.S. Application Data

[63] Continuation of Ser. No. 329,113, Feb. 2, 1973, abandoned.

[30] Foreign Application Priority Data
Feb. 11, 1972 France ............................. 72.04642

[52] U.S. Cl. ........................... 312/263; 312/330 R; 312/257 R
[51] Int. Cl.² .................. A47B 47/00; A47B 43/00
[58] Field of Search ........ 312/108, 111, 140, 257 R, 312/257 SK, 263, 330

[56] References Cited
UNITED STATES PATENTS

| | | | |
|---|---|---|---|
| 3,150,903 | 9/1964 | Chapman et al. | 312/140 X |
| 3,178,246 | 4/1965 | Riles | 312/257 SK |
| 3,429,631 | 2/1969 | Neyroud | 312/257 |
| 3,497,279 | 2/1970 | Chouanec | 312/108 |
| R26,105 | 11/1966 | Guillon et al. | 312/263 |

*Primary Examiner*—Casmir A. Nunberg
*Attorney, Agent, or Firm*—Fisher, Christen & Sabol

[57] ABSTRACT

An assembly system for furniture panels of the kind using profiles provided on the one hand with a fixing tongue which engages in a groove in the panels, and on the other hand one or more flanges perpendicular or parallel to the tongue, wherein at least one of the profiles comprises a section recessed over its entire length, receiving self-tapping screws at its ends.

4 Claims, 2 Drawing Figures

ASSEMBLY SYSTEM FOR FURNITURE PANELS

This is a continuation of my application Ser. No. 329,113, filed Feb. 2, 1973, now abandoned.

BACKGROUND OF THE INVENTION

This invention relates to an assembly system for furniture panels of the type using profiles provided on the one hand with a fixing tongue which engages in a groove in the panels and, on the other hand, one or more flanges perpendicular or parallel to this tongue which enable the profiles to perform several functions at the same time.

BRIEF SUMMARY OF THE INVENTION

According to the invention, this system is distinguished by the fact that at least one of the profiles comprises a section recessed over its entire length, receiving self-tapping screws at its ends.

BRIEF DESCRIPTION OF DRAWINGS

The following description, which is given by way of non-limiting example and with reference to the accompanying drawings, will show clearly how the invention can be put into practice.

In the drawings.

DESCRIPTION OF EMBODIMENTS

Figures 1, 2:
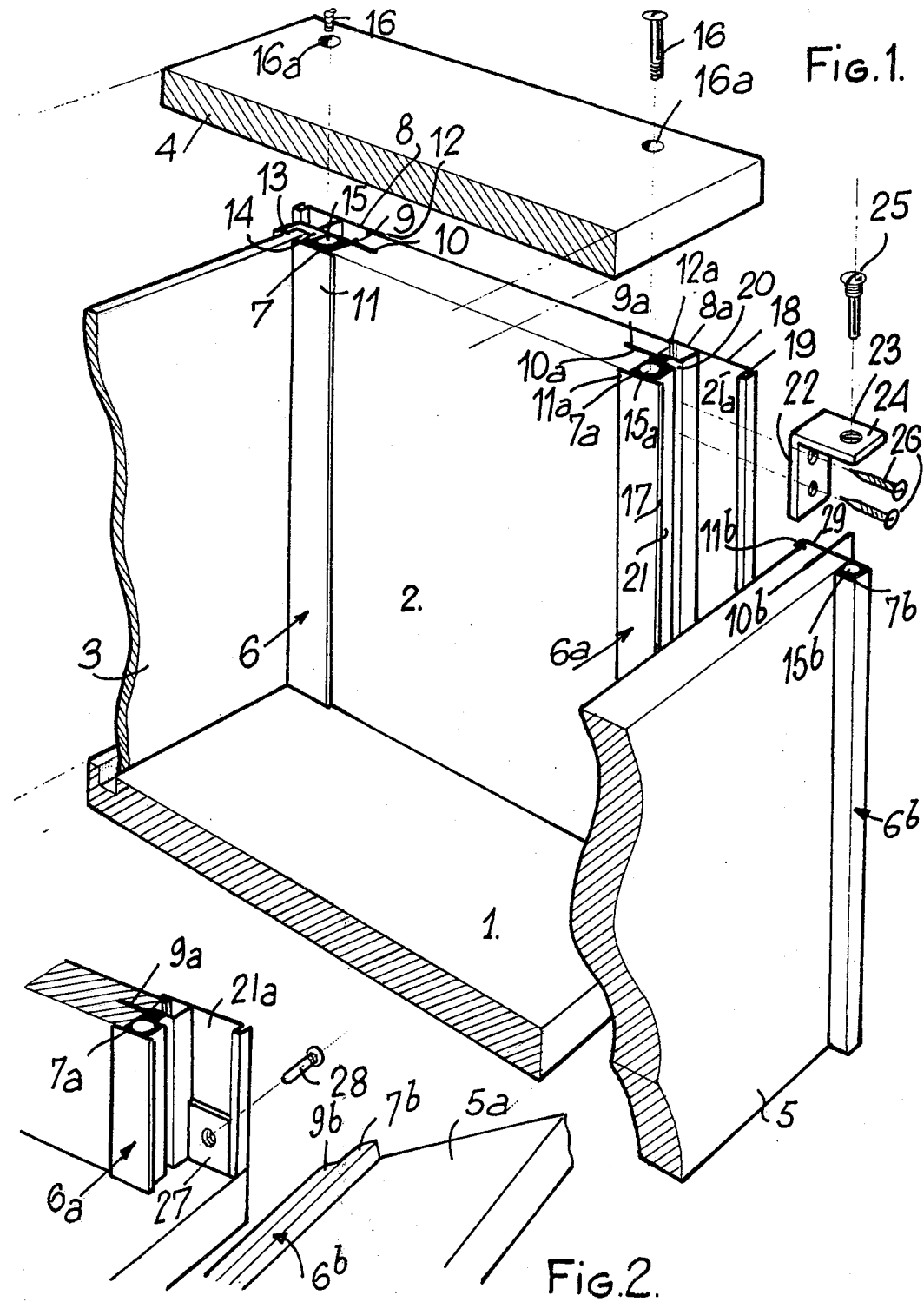
FIG. 1 is a part perspective view, part exploded view of an article of furniture provided with profiles produced in accordance with three embodiments of the invention, the front panel being formed by doors.
FIG. 2 illustrates a modification in which the front panel is formed by a hinged panel.

The article of furniture shown in FIG. 1 comprises a base 1, side panels 2, of which only one is shown, a rear panel 3, a top panel 4 and doors 5 of which only one is shown.

Each side panel 2 is assembled with the rear panel 3 through a rear profile 6 which has a solid web 7 of square cross-section extended on one side by a section 8 which is also square but hollow. Between the web 7 and the section 8, there projects a lateral tongue 9 designed to engage in a groove 10 formed in the edge of the side panel 2 which, in addition, engages between two ribs 11 and 12 parallel to the tongue 9 and projecting in continuation of the outer faces of the web 7 and the hollow section 8. On the side opposite the tongue, in relation to the web 7, there is a projecting rib 13 in the form of an L, one arm of which is situated in the plane of the tongue whilst the other is perpendicular to it, so as to form with the web 7 a recess 14 in which the edge of the rear panel 3 engages perpendicularly to the panel 2. In the web 7, and over its entire length, a hole 15 is formed parallel to the direction of the profile, being designed to receive at its two ends self-tapping screws 16 which enable the top panel 4 and the base 1, formed with corresonding holes 16a, to be fixed to this profile.

Each side panel 2 also receives a front profile 6a which is similar in structure to the profile 6 in regard to the presence and relative arrangement of a solid web 7a, a hollow section 8a, a tongue 9a engaging in a groove 10a in the panel 2, two ribs 11a and 12a holding this panel 2 and a hole 15a in the web 7a for fixing the top panel and the base. On the side opposite its tongue 9a and its ribs 11a and 12a, the profile comprises, in the extension of the ribs 11a and 12a, respectively, a rib 17 of limited height and a flange 18 of considerable span which comprises a perpendicular edge 19 arranged on the same side as the hollow section 8a. In addition, there is provided a slot 20 formed in the base of the channel 21 which defines the web 7a, the hollow section 8a, the rib 17 and the flange 18. This groove 21 is designed to receive at each of its two ends a flange 22 of a fitting 23 in the form of a corner bracket whose second flange 24 supports a vertical pivot 25 about which the door 5 is hinged. The flange 22 of the corner bracket is fixed by metal screws 26 which engage in the slot 20, which thus avoids any need for pre-drilling.

In addition, the hollow section 8a, the flange 18 and the edge 19 define a channel 21a which at one of its ends, for example at its lower end, as shown in the variant in FIG. 2, is designed to receive a fitting 27 in the form of a plate which acts as support to a horizontal pivot 28 about which the leaf or flap 5a (which in this modification replaces the door 5) is hinged.

Each door 5 or the leaf 5a is provided with a hinge profile 6b which has a solid web 7b of square cross-section extended along one of its sides by a flange 29 which, on the same side as the web 7b comprises on the one hand, at its centre, a projecting tongue 9b designed to engage in a groove 10b formed in the edge of the door or leaf, and on the other hand, at its end opposite the web, a rib 11b which with the web encloses the thickness of the door or leaf. In the web 7b, at its two ends, two holes 15b are also formed parallel to the direction of the profile, being designed to receive the pivots 25 or 29 of the door or leaf.

The profiles 6, 6a and 6b are made of a plastics material or of an aluminium alloy, preferably by extrusion.

I claim:

1. In an article of furniture or the like having an assembly comprising at least two fixed vertical panels joined at right angles to each other, fixed top and bottom panels and a hinged panel facing one of said vertical panels, the combination including at least two extruded profiled members for joining said two vertical panels at their adjacent margins in abutting engagement and for hingedly connecting said hinged panel to one of said vertical panels at the margin opposite said adjacent margins, said profiled members including a longitudinally extending tongue received in a slot provided in the respective opposite end margins of said one vertical panel, at least one of said profiled members including a panel locating flange receiving an end margin of the other of the vertical panels in said abutting engagement, at least one of said profiled members including a longitudinal flange covering an end margin of said hinged panel, said profiled members also including a hole extending throughout their lengths, said top and bottom panels being secured by self-tapping screws inserted vertically into the respective ends of the holes in said profiled members to hold the assembly together.

2. A system as claimed in claim 1, wherein at least one of the profiles comprises a solid core of substantially square cross-section provided with a hole extending throughout its length parallel to the direction of the profile to receive a self-tapping screw at the ends thereof.

3. The invention defined in claim 1, wherein one of said profiled members also includes means extending along the length thereof for supporting a hinge assembly for said hinged panel, at any location along said length.

4. The invention defined in claim 3, wherein said means for supporting a hinge assembly comprises a slot adapted to receive self-tapping screws.

* * * * *